(12) United States Patent
Knee

(10) Patent No.: US 7,756,363 B2
(45) Date of Patent: Jul. 13, 2010

(54) SYSTEM AND METHOD FOR IMAGE PROCESSING

(76) Inventor: Michael James Knee, 6 Woodbury Avenue, Petersfield, Hants GU32 2EE (GB)

( * ) Notice: Subject to any disclaimer, the term of this patent is extended or adjusted under 35 U.S.C. 154(b) by 800 days.

(21) Appl. No.: 10/545,384

(22) PCT Filed: Feb. 12, 2004

(86) PCT No.: PCT/GB2004/000544

§ 371 (c)(1),
(2), (4) Date: Feb. 24, 2006

(87) PCT Pub. No.: WO2004/072895

PCT Pub. Date: Aug. 26, 2004

(65) Prior Publication Data

US 2006/0228007 A1    Oct. 12, 2006

(30) Foreign Application Priority Data

Feb. 12, 2004   (GB)   ................... 0303177.0

(51) Int. Cl.
*G06K 9/56* (2006.01)
(52) U.S. Cl. .............. 382/308; 382/225; 382/256; 382/257; 382/304; 382/307
(58) Field of Classification Search ......... 382/308, 382/304, 307, 256, 257, 225
See application file for complete search history.

(56) References Cited

U.S. PATENT DOCUMENTS

| | | | | | |
|---|---|---|---|---|---|
| 4,792,982 A | * | 12/1988 | Devos et al. | ................ | 382/324 |
| 4,972,495 A | * | 11/1990 | Blike et al. | ................ | 382/304 |
| 5,136,662 A | * | 8/1992 | Maruyama et al. | .......... | 382/308 |
| 5,305,395 A | * | 4/1994 | Mahoney et al. | ............ | 382/205 |
| 5,630,156 A | * | 5/1997 | Privat et al. | ................... | 712/14 |
| 5,867,605 A | | 2/1999 | Garrido | | |
| 6,154,809 A | | 11/2000 | Ogura et al. | | |
| 6,633,670 B1 | * | 10/2003 | Matthews | ................. | 382/176 |
| 6,690,828 B2 | * | 2/2004 | Meyers | ....................... | 382/218 |
| 7,555,637 B2 | * | 6/2009 | Rible | ........................ | 712/225 |

(Continued)

OTHER PUBLICATIONS

Bangham et al., "Morphological Scale-Space Preserving Transforms in Many Dimensions", Journal of Electronic Imaging, Jul. 1996, vol. 5(3), pp. 283-299.

(Continued)

*Primary Examiner*—Vu Le
*Assistant Examiner*—Tsung-Yin Tsai
(74) *Attorney, Agent, or Firm*—Knobbe, Martens, Olson & Bear LLP

(57) ABSTRACT

In image processing, parallel and synchronous pixel processing elements have a pixel value register, a neighbor value register, and a processor receiving adjacent pixel and neighbor values for four adjacent pixels. In a series of iterations, the neighbor value register is updated with—in one mode—the maximum and—in another mode—the minimum of: the current value; the pixel value from any adjacent pixel whose pixel value is different from the current pixel value and the neighbor value from an adjacent pixel whose pixel value is the same as the current pixel value. The pixel value is then replaced by the minimum or maximum (depending on the mode) of the current pixel and neighbor values. The modes may alternate with the number of iterations in each series remaining constant or growing.

33 Claims, 4 Drawing Sheets

U.S. PATENT DOCUMENTS

2004/0234137 A1* 11/2004 Weston et al. ............... 382/225
2005/0025357 A1*  2/2005 Landwehr et al. ........... 382/170
2007/0081744 A1*  4/2007 Gokturk et al. ............. 382/305

OTHER PUBLICATIONS

Fejes, S et al., "A Data-Driven Algorithm and Systolic Architecture for Image Morphology", Proceedings of the International Conference on Image Processing (ICIP), Austin, Nov. 13-16, 1994, Los Alamitos, IEEE Comp. Soc. Press, US, vol. 3, Conf. 1, pp. 550-554.

International Search Report, PCT/GB2004/000544, Dec. 13, 2004, 3 pgs.

Shih, Fy et al., "Pipeline Architectures for Recursive Morphological Operations", IEEE Transactions on Image Processing, IEEE Inc., New York, vol. 4, No. 1, 1995, pp. 11-18.

* cited by examiner

SYSTEM AND METHOD FOR IMAGE PROCESSING

PRIOR APPLICATION DATA

The present application is a national phase application of International Application PCT/GB2004/000544, entitled "image Processing" filed on Feb. 12, 2004, which in turn claims priority from United Kingdom Patent Application 0303177.0, filed on Feb. 12, 2003.

FIELD OF THE INVENTION

The present invention relates to image processing, including processing referred to as morphological scale-space transforms or sieves.

BACKGROUND OF THE INVENTION

The invention relates to methods of image processing including those referred to as morphological scale-space transforms or sieves, described in Bangham et al, "*Morphological scale-space preserving transforms in many dimensions*", Journal of Electronic Imaging, July 1996, vol 5(3), pp 283-299. A sieve is essentially a method of image segmentation in which the image is divided into cells (maximal connected regions of equal pixel value) and repeated operations are performed to merge cells together to make larger cells, corresponding to objects in the picture. The following paragraphs define terms and describe the sieve operations.

It is usual to consider a single component of a digital image, for example the luminance. A group of pixels is known as a 4-connected region if it is possible to travel between any two pixels in the group by moving between adjacent pixels horizontally or vertically. The techniques described here extend in an obvious manner to 8-connected, 6-connected or other adjacency criteria. Pixels can be regarded as adjacent to appropriately located pixels in a neighbouring image in a sequence of images. A connected region is called a cell if all its pixels have the same value and it is a maximal such group, i.e. no pixel adjoining the cell has the value of the cell's pixels (adjacency of cells is defined in the natural way through adjacency of the cells' pixels; adjacent cells are also called neighbours). Thus, the image can be considered to be a union of cells where neighbouring cells have distinct pixel values. A cell is a maximum cell if its pixel value is greater than that of all its neighbours; likewise, it is a minimum cell if its pixel value is less than that of all its neighbours. Cells that are either maximum cells or minimum cells are referred to as outlying cells. In segmentation applications, maximum and minimum cells are regarded as corresponding with objects in the scene depicted by the image. The size of a cell is simply defined as the number of pixels it contains.

The basic known sieve operator consists of an opening followed by a closing. This is applied successively under the control of a scale value which begins at 1 and increments after each sieve operation. The opening operator only affects pixels in maximum cells whose size is equal to the scale value. It changes them all to be equal to the maximum neighbouring pixel. Likewise, the closing operator only affects pixels in minimum cells whose size is equal to the scale value. It changes them all to be equal to the minimum neighbouring pixel. It follows that the opening operator always expands maximum cells by at least one pixel and the closing operator always expands minimum cells by at least one pixel. Therefore, an opening followed by a closing expands outlying cells by at least one pixel. It follows that after opening and closing with a certain scale, all outlying cells will be bigger than the scale value.

The sieve is formed by applying the opening and closing operators alternately. The picture obtained at each stage is of interest—it looks progressively simpler but edges that do remain do not move or become blurred. The sieve itself consists of the differences between successive pairs of opening and closing operators. Thus, successive elements of the sieve extract successively larger objects from the picture. It also follows that the original picture can be reconstructed by summing all the sieve elements.

The most computationally intensive task in implementing sieves is the opening or closing operator itself. The two operators are equivalent except for changes in the sense of comparisons between pixel values. The need for repeated applications of the opening and closing operators as the scale factor increments, hampers attempts to perform the sieve operation more quickly. It is also unhelpful that the processing speed and memory requirements of known software are picture dependent. It is thus difficult to guarantee real-time processing of, for example video material, unless the processing speed is made extremely fast and a very large amount of high-bandwidth memory is made available.

SUMMARY OF THE INVENTION

It is an object of one aspect of the present invention to provide a digital circuit and an improved image processing method that is faster than the above described prior art.

It is an object of one aspect of the present invention to provide a digital circuit and an improved image processing method that has a processing speed that is independent of or less dependent on image content.

It is an object of one aspect of the invention to provide a digital circuit and an improved method for object identification in an image or sequence of images.

Accordingly the present invention consists in one aspect in a digital circuit for object identification in an image or a sequence of images, each image consisting of an array of pixels; the circuit comprising a plurality of synchronously-operating like pixel processing elements, one for each pixel in the pixel array of an image, each pixel processing element comprising a pixel value register receiving a value for that pixel, a neighbour value register, and a processor connected with said pixel value register and said a neighbour value register, the processor being adapted to receive adjacent pixel values and adjacent neighbour values for at least two adjacent pixels in that one image or in either of the images respectively preceding and succeeding that one image in the sequence of images, the processor being adapted in a series of iterations to replace the value in the neighbour value register with one of: the current value in the neighbour value register; the adjacent pixel value from an adjacent pixel whose pixel value is different from the current value of the pixel value register or the adjacent neighbour value from an adjacent pixel whose pixel value is the same as the current value of the pixel value register.

Pixel values may be components such as luminance, but other components could equally be considered, which components might be the output of a pre-processing operation.

Preferably the pixel values are luminance values and objects which are identified are visible picture objects. Other types of pixel values may be used however, and objects which are identified may simply refer to a collection of pixels having similar values for an attribute with a single degree of freedom.

A sequence of images will typically comprise a three-dimensional space such as temporally spaced images in a video sequence or depth spaced images in a tomographic scan sequence. In certain embodiments the image space can be four-dimensional, for example a temporal sequence of three-dimensional tomographic scans.

In one embodiment, the present invention comprises a synchronous digital circuit for implementing a fast sieve opening or closing operation on a digital picture characterized in that the circuit contains identical processing elements, one for each pixel processing elements are connected wherever the corresponding pixels are adjacent each processing element contains a pixel value register, a maximum neighbour value register, a multiple-input maximum value function element, a minimum-value function element, multiple two-input comparators and data selectors, pixel value inputs and outputs to and from adjacent processing elements and maximum neighbour inputs and outputs to and from adjacent processing elements the opening operation consists of an initialization phase, a main processing phase and a final phase the initialization phase consists in loading the maximum neighbour register with a value less than the minimum possible pixel value the circuit includes a clock pulse counter which starts counting at the end of the initialization phase and which counts to a value related to the horizontal and vertical dimensions of the picture the main processing phase is carried out while the counter is counting on each clock pulse of the main processing phase, identical operations are performed in parallel by each processing element each operation in the main processing phase consists in replacing the contents of the maximum neighbour register with the maximum of the following values the current value of the maximum neighbour register the adjacent pixel value, for each such value that is different from the local pixel value held in the pixel value register the adjacent maximum neighbour value, for each adjacent processing element whose pixel value is equal to the local pixel value held in the pixel value register the final processing phase consists in replacing the contents of the pixel value register with the minimum of the following values the current value of the pixel value register the value of the maximum neighbour register the closing operation is the same as the opening operation except that minimum and maximum operators are reversed.

In another aspect, the present invention consists in a method for processing an image or a sequence of images, each image consisting of an array of pixels; the method comprising a plurality of synchronously-operating like pixel processing routines, one for each pixel in the pixel array of an image, each pixel processing routine maintaining a pixel value and a neighbour value and having access to adjacent pixel values and adjacent neighbour values for at least two adjacent pixels in that one image or in either of the images respectively preceding and succeeding that one image in the sequence of images, the routine serving in a series of iterations to replace the neighbour value with a function of: the current neighbour value; the adjacent pixel value from an adjacent pixel whose pixel value is different from the current pixel value or the adjacent neighbour value from an adjacent pixel whose pixel value is the same as the current pixel value.

In a further aspect the invention comprises a digital circuit for parallel processing an image or a sequence of images, each image consisting of an array of pixels; the circuit comprising a plurality of synchronously-operating like pixel processing elements, one for each pixel in the pixel array of an image, each pixel processing element comprising a pixel value register for receiving a value for that pixel, a coordinate register for receiving the coordinates of a pixel processing element, and a processor connected with said pixel value register and said coordinate register, the processor being adapted to receive pixel values and coordinate values for at least two adjacent pixels in that one image or in either of the images respectively preceding and succeeding that one image in the sequence of images, and wherein the processor of one or more first pixel processing elements also receives the pixel value of a non-adjacent pixel, which non-adjacent pixel is selected in dependence upon the value of the coordinate register of said one or more first pixel processing elements.

In another aspect the invention consists in a method of object identification in an image or sequence of images, each image consisting of an array of pixels, the method comprising:

simultaneously identifying all cells of all adjacent pixels having the same pixel values;

selecting those cells whose pixel value is greater than the pixel value of all pixels adjacent to those cells;

updating the pixel values of pixels in each selected cell to be equal to the maximum pixel value of the pixels adjacent to that selected cell;

simultaneously identifying all cells of all adjacent pixels having the same pixel values;

selecting those cells whose pixel value is less than the pixel value of all pixels adjacent to those cells; and updating the pixel values of pixels in each selected cell to be equal to the minimum pixel value of the pixels adjacent to that selected cell; and identifying as an object all pixels in a single cell.

Examples of the invention disclosed here overcome the problems of the prior art by using a hardware circuit which has one small processing element for each pixel and which guarantees completion of the fast opening or closing operation within a fixed number of clock periods. In addition, a version of the operation (which may differ in usually inconsequential respects from the mathematically defined prior art operation) can be guaranteed with far fewer clock periods. At a suitable clock rate, multiple opening and closing operations can therefore be carried out in real time.

BRIEF DESCRIPTION OF THE DRAWINGS

The invention will now be described by way of example with reference to the accompanying figures in which.

DETAILED DESCRIPTION OF THE INVENTION

It is helpful to describe this embodiment with reference to the known algorithm. The known opening operation at a certain scale value R consists of setting the pixels of all maximum cells of size R to the maximum neighbouring pixel value. The modified version of the opening operation, referred to here as "fast opening", removes the restriction that the maximum cells should be of size R. It is apparent that they will be of size R or greater, because the size of maximum cells is increased by at least 1 at each iteration. In the fast opening operation, the pixels of all maximum cells are set to the maximum neighbouring pixel value. The fast closing operation is defined equivalently, and the successive application of fast opening and fast closing operations defines the "fast sieve" of this embodiment.

The fast sieve has two advantages for hardware implementation. The first is that the maximum number of opening and closing operations that can be carried out before the whole picture is simplified to one region is much lower than for the classical sieve. In the classical sieve, the number of opening and closing operations is equal to one less than the number of pixels in the picture, which for example for a typical computer display is at least half a million. In the fast sieve, the maximum number of opening and closing operations is determined instead by the grey-level resolution of the pixels. This is because in each opening operation the pixel value of every maximum cell is reduced by at least one grey level, which means that the maximum pixel value in the sieved picture is also reduced by at least one grey level.

A theoretical disadvantage of the fast sieve is that the output after each opening and closing operation can no longer rigidly be interpreted as belonging to a particular scale value. However, this would only be of concern where the sieve was being used as an objective tool for picture analysis. It is not a problem when the sieve is being applied as an image segmentation tool or for other image processing operations.

Figure 1:
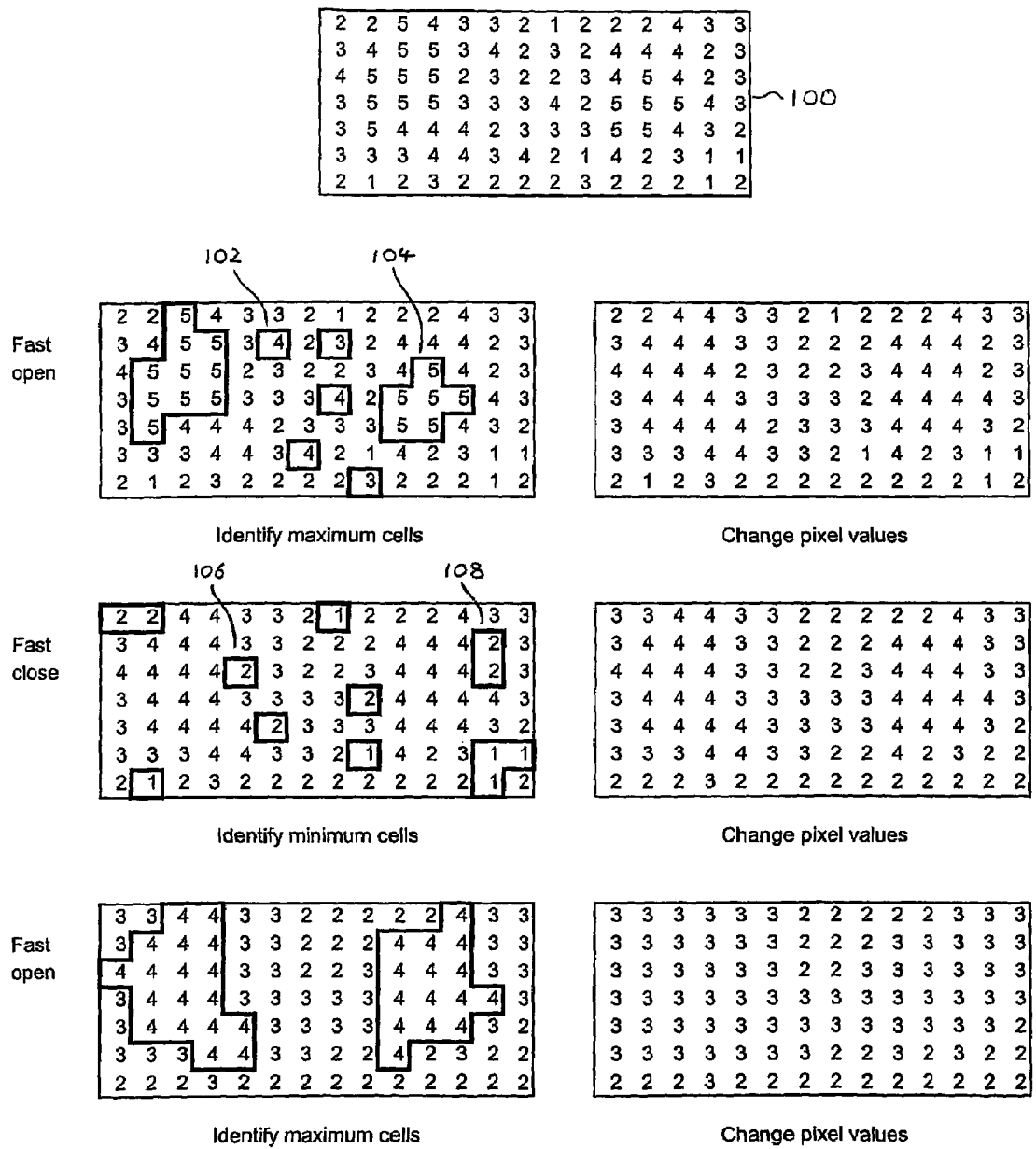
FIG. 1 illustrates a schematic sieve operation according to an embodiment of the present invention.

FIG. 1 shows a schematic representation of a fast sieve operation on an exemplary input data set 100. The first operation is a 'fast open'. Here maximum cells, eg 102 & 104 are identified. As explained, a cell is a maximum cell if its pixel value is greater than that of all its neighbours, ie a local maximum. It can be seen that all maximum cells are selected, regardless of the size of the maximum cell. The values of these maximum cells are then changed to be equal to the maximum neighbouring pixel, which in this example reduces the value of all selected cells by one.

The next stage of the sieve is a fast close operation. Here minimum cells, eg 106, 108, are identified and the value of each minimum cell is then increased to be equal to the minimum neighbouring pixel, which in this example increases the value of all selected cells by one.

A second fast opening step is then shown, which operates in an identical fashion to the first fast opening step. Here it can be seen that as a result of the first two processing stages the size of the cells is considerably increased.

After each opening or closing operation it can be seen that the range of pixels values in the data set (in this case, for example, greyscale values) is reduced by one. The input data set 100 has a range of five discrete values, and therefore after three processing stages, the set has been reduced to a range of two values. A second closing stage would have the effect of reducing the entire data set to a single vale.

Figure 2:
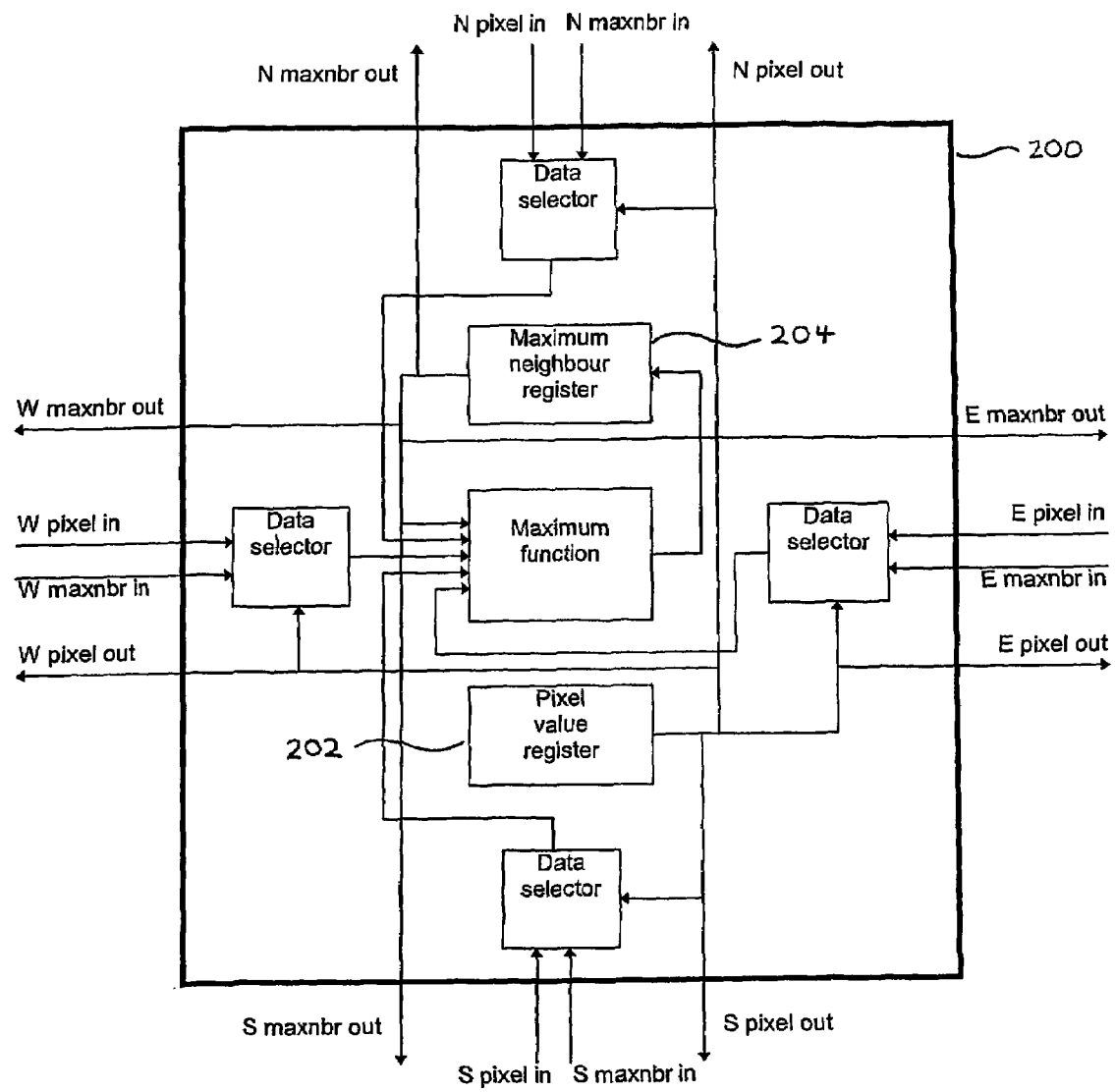
FIG. 2 is a block diagram of a pixel processing element in a digital circuit according to an embodiment of the present invention.

Referring now to FIG. 2, there is shown a processing element 200 for one pixel of the picture.

The processing element communicates with identical elements associated with the neighbouring pixels, which for convenience are denoted by compass points, N, E, S and W. Processing elements are therefore connected together in a rectangular array. The principle of operation of the array is that each processor calculates its maximum neighbour from the information available to it at the present moment, and then it exchanges its results with any neighbouring pixels that are in the same connected region.

Before any sieve processing is carried out, the pixel value register 202 in each processing element is loaded with the corresponding input pixel value. The pixel value register contents are updated at each opening and closing operation, so that at any stage the current output is given by the register contents.

For an opening operation, the detailed operation of a processing element takes place in three phases: an initialization phase, a main processing phase and a final phase.

In the initialization phase, the maximum neighbour register 204 is loaded with any value that is less than the minimum possible pixel value.

The main processing phase is carried out once per clock period for a period to be determined as described below. In each clock period, the contents of the maximum neighbour register are replaced with the maximum of the following values:
 the current value of the maximum neighbour register
 the adjacent pixel value, for each such value that is different from the local pixel value held in the pixel value register
 the adjacent maximum neighbour value, for each adjacent processing element whose pixel value is equal to the local pixel value held in the pixel value register It can be seen that the above comparison is equivalent to selecting, for each of the four adjacent processing elements, the contents of either of its two registers according to whether the adjacent pixel has the same value as the current pixel, placing it in the same connected region, or has a different value, placing it in a neighbouring region. This selection is the function of the four data selectors shown in the block diagram.

In the final phase, which is not shown in the diagram, the contents of the pixel value register are replaced with the minimum of the following values
 the current value of the pixel value register
 the value of the maximum neighbour register This is equivalent to determining whether the current pixel is in a maximum cell (in which case its maximum neighbour will have a lower value) and, if so, merging the current pixel into the maximum neighbouring region.

Determining the number of times to repeat the main processing phase is a trade-off between accuracy of the sieve operation and processing speed. In principle, the main processing phase should be repeated a number of times that is one less then the maximum of the shortest path lengths between any two pixels through connected regions of the picture. This would allow any maximum-neighbour information obtained at any point in a connected region to propagate to every other point in the region. It is possible to conceive of regions whose shortest path is approximately half the number of pixels in the picture; examples include a spiral pattern or a zigzag pattern. However, such cases are extremely unlikely to occur in practice, and it is much more reasonable to assume that the maximum shortest path is approximately equal to the sum of the horizontal and vertical dimensions of the picture. In the rare case of a region whose maximum shortest path length is longer than the number of clock cycles in the main processing phase, the worst that can happen is that a region might split into two, an event that should not usually occur in sieve processing. However, experience has shown that this limitation does not cause problems in practice.

After the opening operation, the same processing elements can be used to perform a closing operation. The only differences are that the "maximum neighbour" register becomes a minimum neighbour register, initialised to a value higher than the maximum possible pixel value, and that the senses of all comparison, maximum and minimum operations are reversed.

Figure 3:
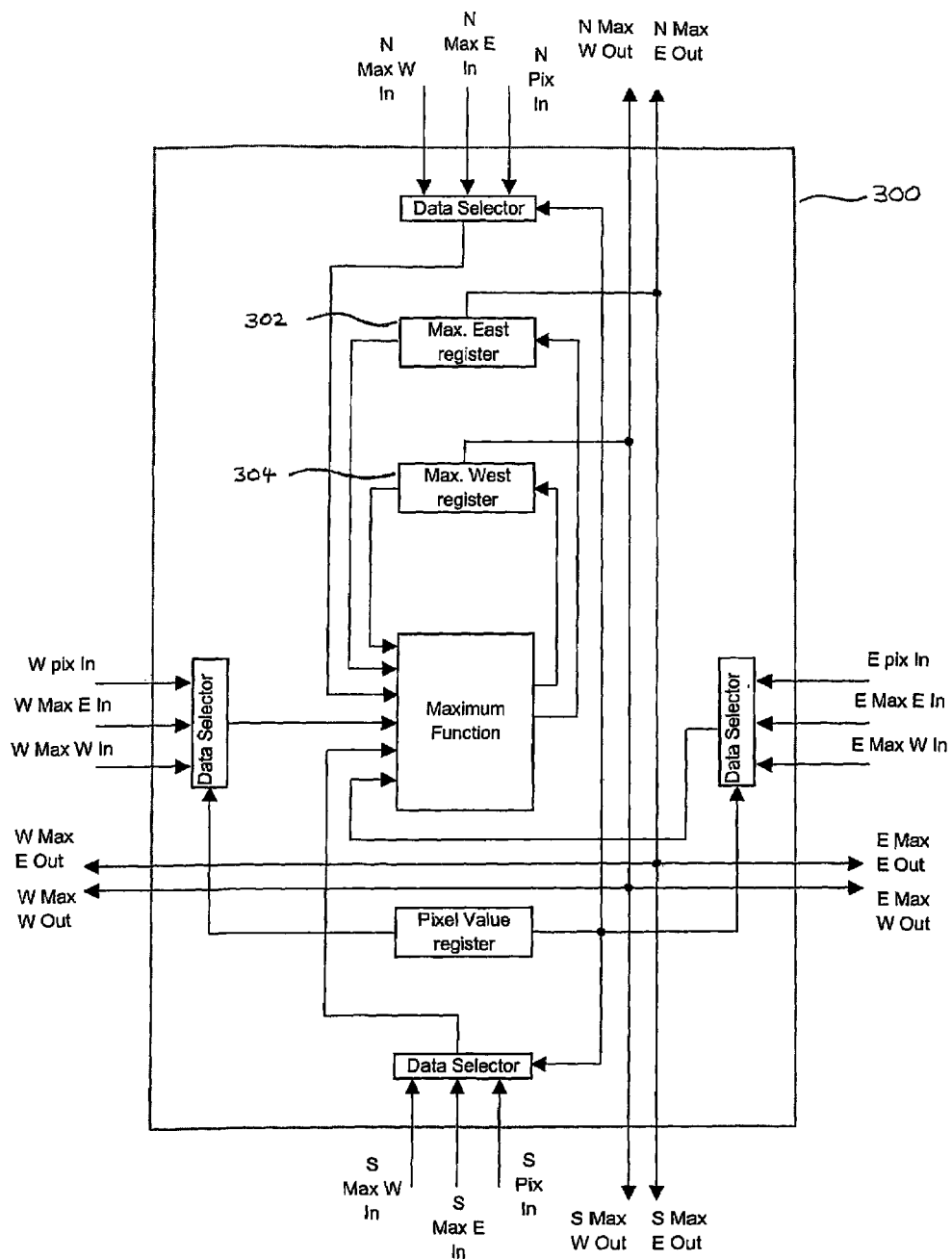
FIG. 3 is a block diagram of a pixel processing element in a digital circuit according to a further embodiment of the present invention.

FIG. 3 shows a processing element 300 for one pixel, for a further embodiment of the invention. As with FIG. 2, the element communicates with neighbouring pixels denoted N, E, S, W, arranged in a rectangular array.

A maximum East value register 302, and a maximum West value register 304 are provided. Further registers, for example a maximum neighbour register as described above will typically also be provided, but are not shown in FIG. 3 to improve clarity. These maximum East and maximum West value registers operate in a similar fashion to the maximum neighbour register of FIG. 2, in that maximum East and maximum West values are received from elements N, S, E, W. These values represent pixel element, and therefore processing element coordinates, and registers 302 and 304 are adapted to store two values each (eg x and y values for a rectangular array). The purpose of these registers is to propagate throughout a cell the coordinates of the Easternmost pixel and the coordinates of the Westernmost pixel in that cell. This is performed as follows.

In each clock period, the maximum East register is replaced with the value having the most Easterly East coordinate (ie the maximum×coordinate) of the following:

The current value of the maximum East register
The coordinates of its own pixel if the adjacent cell to the East has a different value from the local pixel value held in the pixel value register.
The maximum East value for each adjacent cell having the same pixel value as the local pixel value held in the pixel value register It should be noted that the North-South, or y coordinate of the maximum East value is not compared, but must still be stored and passed throughout a cell to identify the Easternmost pixel in a cell.

The maximum West register operates in an analogous fashion to the maximum East register.

After a certain number of clock cycles the coordinates of the Easternmost and Westernmost pixel in a cell will be loaded in the appropriate register of all processors in that cell. By having this information available, it is possible to establish a link between the Easternmost and Westernmost pixels in that cell, which for the purpose of future processing stages can be treated as neighbouring elements, even though they will typically be non-adjacent physically. This link can act in exactly the same way as the fixed links to neighbouring N, S, E and W pixels, effectively producing a cell with five adjacent cells. This link will typically be via a central processor for the array, and not by a dedicated connection. The link can therefore be configured dynamically.

This dynamic link is useful in reducing the number of clock cycles required to propagate the emergence of new information from the edge of a cell throughout the cell in later processing stages, where it can be assumed that the cell will not diminish in size, as is the case for the fast open and fast close stages described above. It can be seen that a piece of information, such as a maximum neighbour value can pass from one side of a cell to the other in a single clock cycle, and may propagate from either side of the cell inwards, rather than having to progress from one side to the other. In a regularly shaped cell this will approximately halve the number of clock cycles necessary to pass information from the edge of the cell throughout the cell.

While East and West coordinates have been illustrated in this example, it will be understood that North and South coordinates could equally be used as an alternative or in addition, with more than one 'dynamic' link being set up. In fact, once a number of reference cells (ie Northernmost etc.) are known, they can each be joined in a similar fashion to accelerate the propagation of information throughout the cell.

Using the example of the fast sieve operation described above, it will be noted that once a link between cell extremities has been established, the cell will continue to grow beyond these extremities with each opening and closing operation. This may actually make the link more effective at reducing the number of clock cycles that would otherwise be required to completely propagate information for certain cell configurations. In situations where this is the case it may actually be advantageous, after a processing stage, to establish a link not between the cell extremities as determined by the, say, Easternmost and Westernmost coordinates, but between points further towards the centre of the cell. For example, candidate pixels which are identified as being located at approximately ¼ and ¾ of the extent of the cell in a given direction could be joined by a dynamic link. It should also be noted that new links may be set up at after each processing stage if desired. In this way, new links may be set up after a predetermined number of cycles have been undertaken. Alternatively new links may be set up in dependence on the growth of the cell, for example, after it has grown by a certain percentage.

When establishing a number of links as described above, care must be taken not to introduce redundant links which add little or nothing to the speed of propagation of information across the cell. In certain embodiments it may be advantageous to set up dynamic links in a random or pseudo-random fashion.

There are several possible ways of dealing with the edges of the picture, all of which will be obvious to the skilled reader. For example:

the processing elements could be modified to omit inputs and outputs beyond the picture edges
the inputs at the picture edges could be given constant values
the right and left edges and the top and bottom edges could be connected together, giving the picture a toroidal topology.

The number of opening and closing operations to perform depends on the application. For example, a small number has the effect of noise reduction on the picture, while a larger number produces a cartoon-like effect. A still larger number could be used to produce a segmentation of the picture.

Different variations of the invention will use different techniques for determining the number of iterations to perform for each operation. In one variation, the number of iterations is not constant, but will vary with image content. The drawback associated with this variation may be offset in certain applications by an improvement in the quality of the image processing. In one arrangement exemplifying this variation, a central controller is told if the state of any processing element has changed at the current iteration in a so-called a "semaphore" system. If this signal is received by the central controller, the processing continues to the next iteration. If no such signal is received, it can be inferred that the processing has "converged" and that it is appropriate without quality penalty to move on to the final processing phase.

In, another variation, the number of iterations in each series starts at a relatively low level and increases after each final processing phase.

As mentioned previously the output of the sieve at each stage is of interest. This is true of the image produced at each stage, but certain embodiments of the invention will also utilise the cell grouping information or object recognition performed by the sieve at each stage or at a specific stage. It is therefore useful to consider the number of processing stages which should be performed before an output is taken from the sieve. In one embodiment the sieve may be 'stopped' when any cell reaches a maximum size, either in terms of the number of pixels in that cell, or in terms of the extent of the cell in a given direction. In an alternative embodiment, the sieve is stopped when a pixel value is changed by more than a predetermined threshold with reference to its original pixel value. Decisions on how many processing stages are performed can be made either globally across the image, or locally eg. in relation to certain groups of cells or image regions.

In certain embodiments it will be useful to maintain the original pixel values in parallel with the modified values output from the sieve. In such embodiments it may be useful to enumerate the cells output from the sieve. In this way each pixel is provided with a value which uniquely identifies to which cell it belongs. This value can then be used in subsequent processing of the image, which may be the modified image output from the sieve, or the original image input to the sieve.

Figure 4:
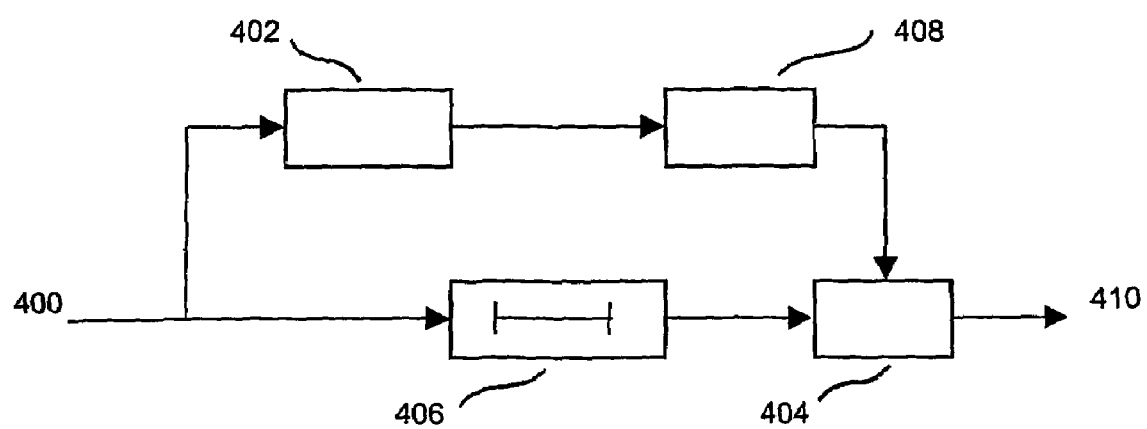
FIG. 4 is a block diagram of an image processing apparatus according to an embodiment of the invention.

FIG. 4 shows an embodiment of the invention in which an input image signal 400 is passed to a sieve 402. The input image signal is also passed in parallel to a downstream processing element 404, optionally via delay 406. The output from the sieve is passed to an enumeration stage 408, which assigns a unique cell identification value to each pixel, and passes these values to processing element 404, where these values are combined with the original input image to produce an output signal 410. In one embodiment the cell identification values are combined as metadata. Output signal 410 therefore maintains the original image values, but additionally includes information from the object identification performed by the sieve 402.

It will be recognised that this invention has been described by way of example only and that a wide variety of modifications can be made without departing from the scope of the invention.

Whilst the classical sieve is followed most closely in an arrangement of the present invention in which "opening" modes alternate with "closing" modes (the maximum and minimum functions reversing between the two modes), there will applications in which repeated processing with the same function will offer advantages. Indeed, in such an application, functions other than maximum and minimum may be used. Thus it will be sometimes be appropriate to apply functions other than maximum and minimum to the values:

current neighbour value;
adjacent pixel value from any adjacent pixel whose pixel value is different from the current pixel value; and
adjacent neighbour value from an adjacent pixel whose pixel value is the same as the current pixel value.

in order to update the neighbour value. One such other function is the median. The median function shares (in most cases) with maximum and minimum functions the feature of returning as a value a selected value from the inputs. Other functions can be envisaged which do not share this feature.

The invention claimed is:

1. A digital circuit for object identification in an image or a sequence of images, each image comprising an array of pixels, the circuit comprising:
    a processor comprising a plurality of processing components;
    a plurality of substantially synchronously-operating pixel processing elements, one for each pixel in the pixel array of an image, each pixel processing element comprising a pixel value register receiving a value for that pixel and a neighbor value register, wherein each pixel processing element is associated with at least one of the processing components, and wherein the processor is configured to cause the digital circuit to perform the following operations for respective pixels:
        receive adjacent pixel values and adjacent neighbor values for at least two adjacent pixels in the image or in either of the images respectively preceding and succeeding the image in the sequence of images, and
        in a series of iterations, replace the value in the neighbor value register with a function of:
            a current value in the neighbor value register;
            the adjacent pixel value from an adjacent pixel whose pixel value is different from the current value of the pixel value register; or
            the adjacent neighbor value from an adjacent pixel whose pixel value is the same as the current value of the pixel value register.

2. A circuit according to claim 1, wherein one or more components of the plurality of processing components are adapted at the end of the series of iterations to store in the pixel value register one of the current value of the pixel value register and the current value of the neighbor value register.

3. A circuit according to claim 1, wherein the function comprises the selection of one value from the values.

4. A circuit according to claim 3, wherein the selection comprises one of the minimum, the maximum, or the median of the values.

5. A circuit according to claim 1, wherein one or more components of the plurality of processing components are adapted in each iteration of the series of iterations to store in the neighbor value register the maximum of:
    the current value in the neighbor value register;
    each adjacent pixel value from respective adjacent pixels whose pixel values are different from the current value of the pixel value register; and
    each adjacent neighbor value from respective adjacent pixels whose pixel values are the same as the current value of the pixel value register.

6. A circuit according to claim 5, wherein one or more components of the plurality of processing components are adapted at the end of the series of iterations to store in the pixel value register the minimum of the current value of the pixel value register and the current value of the neighbor value register.

7. A circuit according to claim 1, wherein one or more components of the plurality of processing components are adapted in each iteration of the series of iterations to store in the neighbor value register the minimum of:
    the current value in the neighbor value register;
    each adjacent pixel value from respective adjacent pixels whose pixel values are different from the current value of the pixel value register; and
    each adjacent neighbor value from respective adjacent pixels whose pixel values are the same as the current value of the pixel value register.

8. A circuit according to claim 7, wherein one or more components of the plurality of processing components are adapted at the end of the series of iterations to store in the pixel value register the maximum of the current value of the pixel value register and the current value of the neighbor value register.

9. A circuit according to claim 1, wherein one or more components of the plurality of processing components
are adapted in a first mode to
store in the neighbor value register the maximum of:
a current value in the neighbor value register;
each adjacent pixel value from respective adjacent pixels whose pixel values are different from the current value of the pixel value register; and
each adjacent neighbor value from respective adjacent pixels pixel whose pixel values are the same as the current value of the pixel value register; and
at the end of the series of iterations to store in the pixel value register the minimum of the current value of the pixel value register and the current value of the neighbor value register; and
are adapted in a second mode to
store in the neighbor value register the minimum of:
the current value in the neighbor value register;
each adjacent pixel value from respective adjacent pixels whose pixel values are different from the current value of the pixel value register;
each adjacent neighbor value from respective adjacent pixels whose pixel values are the same as the current value of the pixel value register; and
at the end of the series of iterations to store in the pixel value register the maximum of the current value of the pixel value register and the current value of the neighbor value register.

10. A circuit according to claim 9, wherein one or more components of the plurality of processing components alternate between two modes of operation.

11. A circuit according to claim 1, wherein the number of iterations in the series of iterations remains constant.

12. A circuit according to claim 1, wherein the series of iterations is controlled by a clock which counts to a value related to the horizontal and vertical dimensions of the image.

13. A circuit according to claim 1, wherein the series of iterations is controlled by a central controller which receives from each pixel processing element an indication of whether that processing element has in the current iteration changed the value of the neighbor value register.

14. A method for object identification in an image or a sequence of images, each image comprising an array of pixels, the method comprising
performing a plurality of substantially synchronously-operating like pixel processing routines, one for each pixel in the pixel array of an image, each pixel processing routine comprising:
maintaining a pixel value and a neighbor value for the pixel,
selectively accessing adjacent pixel values and adjacent neighbor values for at least two adjacent pixels in the image or in either of the images respectively preceding and succeeding the image in the sequence of images, and
performing a series of iterations to replace the neighbor value with a function of:
the current neighbor value;
the adjacent pixel value from an adjacent pixel whose pixel value is different from the current pixel value or
the adjacent neighbor value from an adjacent pixel whose pixel value is the same as the current pixel value.

15. A method according to claim 14, wherein the processing routine at the end of the series of iterations maintains as the pixel value one of the current pixel value and the current neighbor value.

16. A method according to claim 14, wherein the function comprises the selection of one value from the values.

17. A method according to claim 16, wherein the selection comprises one of the minimum, the maximum or the median of the values.

18. A method according to claim 16, further comprising stopping the series of repeated iterations when a current pixel value differs from its original value by more than a predetermined threshold.

19. A method according to claim 14, in which there are repeated series of iterations with the pixel value being replaced with one of the current pixel value and the current neighbor value at the end of each such series.

20. A method according to claim 19, wherein the function varies from one series of iterations to the next repeated series of iterations.

21. A method according to claim 19, in which the number of iterations in each series is constant.

22. A method according to claim 19, in which the number of iterations in each series increases as the series are repeated.

23. A method according to claim 19, in which the number of iterations in each series is determined in a control procedure.

24. A method according to claim 23, further comprising initiating transmission of an indication of whether that processing routine has in the current iteration changed the neighbor value to the control procedure.

25. A method according to claim 14, further comprising, after a series of iterations, identifying cells of all adjacent pixels having the same current pixel value.

26. A method according to claim 25, further comprising stopping the series of repeated iterations when the number of pixels in a cell exceeds a predetermined number of pixels.

27. A method according to claim 25, further comprising outputting an indication of the cell to which each pixel belongs.

28. A digital circuit for object identification in an image or a sequence of images, each image comprising an array of pixels; the circuit comprising:
a plurality of substantially synchronously-operating pixel processing elements each including
a pixel value register;
a neighbor value register;
means for receiving adjacent pixel values and adjacent neighbor values for at least two adjacent pixels;
means for performing a series of iterations to replace the value in the neighbor value register with a function of:
a current value in the neighbor value register;
an adjacent pixel value from an adjacent pixel whose pixel value is different from the current value of the pixel value register; or
an adjacent neighbor value from an adjacent pixel whose value is the same as the current value of the pixel value register.

29. The circuit of claim 28, wherein each pixel processing element further comprises:
means for storing in the pixel value register at the end of the series of iterations one of the current value of the pixel value register and the current value of the neighbor value register.

30. A method for processing an image comprising an array of pixels, the method comprising;
   performing a plurality of iterations of substantially synchronous pixel processing routines, one routine for each pixel in a pixel array of an image, each routine comprising:
      storing a current pixel value and a current neighbor value,
      determining adjacent pixel values and adjacent neighbor values for at least two adjacent pixels in the image; and
      replacing the current neighbor value with a function of the current neighbor value;
         the adjacent pixel value from an adjacent pixel whose pixel value is different from the current pixel value; or
         the adjacent neighbor value from an adjacent pixel whose pixel value is the same as the current pixel value.

31. The method of claim 30, wherein the pixel array of an image includes a portion of the pixels of the image.

32. The method of claim 30, wherein the function comprises selecting one value from the current neighbor value, the adjacent pixel value, and the adjacent neighbor value.

33. The method of claim 30, further comprising at the end of the plurality of iterations storing as the current pixel value one of the current pixel value and the current neighbor value.

* * * * *

UNITED STATES PATENT AND TRADEMARK OFFICE
CERTIFICATE OF CORRECTION

| | | |
|---|---|---|
| PATENT NO. | : 7,756,363 B2 | Page 1 of 1 |
| APPLICATION NO. | : 10/545384 | |
| DATED | : July 13, 2010 | |
| INVENTOR(S) | : Michael James Knee | |

It is certified that error appears in the above-identified patent and that said Letters Patent is hereby corrected as shown below:

Title Page 1 (Item 30) Foreign Application Priority Data, Line 2, Change "2004" to --2003--.

At Column 1, Line 8, Change ""image" to --"Image--.

At Column 5, Line 2, Change "invention;" to --invention.--.

At Column 5, Line 67, Change "vale." to --value.--.

At Column 6, Line 56, Change "then" to --than--.

At Column 9, Line 3, Change "In," to --In--.

At Column 11, Line 16, In Claim 9, after "pixels" delete "pixel".

Signed and Sealed this
First Day of February, 2011

David J. Kappos
*Director of the United States Patent and Trademark Office*